(12) United States Patent  
Ludtke

(10) Patent No.: US 7,268,773 B2
(45) Date of Patent: Sep. 11, 2007

(54) DATA ENTRY USER INTERFACE

(75) Inventor: Harold A. Ludtke, San Jose, CA (US)

(73) Assignees: Sony Corporation (JP); Sony Electronics, Inc., Park Ridge, NJ (US)

( * ) Notice: Subject to any disclaimer, the term of this patent is extended or adjusted under 35 U.S.C. 154(b) by 67 days.

(21) Appl. No.: 10/870,300

(22) Filed: Jun. 17, 2004

(65) Prior Publication Data
US 2004/0239649 A1 Dec. 2, 2004

Related U.S. Application Data

(63) Continuation of application No. 09/816,273, filed on Mar. 22, 2001, now Pat. No. 6,867,764.

(60) Provisional application No. 60/191,149, filed on Mar. 22, 2000.

(51) Int. Cl.
G09G 5/00 (2006.01)

(52) U.S. Cl. .................. 345/173; 345/174; 345/175; 345/833

(58) Field of Classification Search ............. 345/173, 345/174, 175, 833
See application file for complete search history.

(56) References Cited

U.S. PATENT DOCUMENTS

| | | |
|---|---|---|
| 5,131,038 A | 7/1992 | Puhl et al. |
| 5,276,736 A | 1/1994 | Chaum |
| 5,329,589 A | 7/1994 | Fraser et al. |
| 5,418,549 A | 5/1995 | Anderson et al. |
| 5,521,890 A | 5/1996 | Miche et al. |
| 5,604,805 A | 2/1997 | Brands |
| 5,696,827 A | 12/1997 | Brands |
| 5,712,913 A | 1/1998 | Chaum |
| 5,778,384 A | 7/1998 | Provino et al. |
| 5,943,052 A * | 8/1999 | Allen et al. ................ 715/787 |
| 5,963,207 A | 10/1999 | Brewer et al. |
| 6,014,661 A | 1/2000 | Ahlberg et al. |
| 6,108,644 A | 8/2000 | Goldschlag et al. |
| 6,147,683 A | 11/2000 | Martinez et al. |
| 6,226,618 B1 | 5/2001 | Downs et al. |
| 6,339,438 B1 | 1/2002 | Bates et al. |
| 6,388,665 B1 | 5/2002 | Linnett et al. |
| 6,434,447 B1 | 8/2002 | Shteyn |
| 6,442,440 B1 | 8/2002 | Miller |
| 6,459,435 B1 * | 10/2002 | Eichel ......................... 345/588 |
| 6,480,194 B1 | 11/2002 | Sang'udi et al. |
| 6,489,951 B1 | 12/2002 | Wong et al. |
| 6,512,530 B1 * | 1/2003 | Rzepkowski et al. ....... 715/833 |
| 6,629,197 B1 | 9/2003 | Bhogal et al. |
| 6,829,779 B1 | 12/2004 | Perlman |

OTHER PUBLICATIONS

Microsoft Visual Basics 6.0 Programmers Guide, pp. 48-50, 241-246, 257-280, 321-326 (Microsoft Press 1998).
Using the Slider Control, http://msdn.microsoft.com/library/devprods/vs6/vbasic/vbcon98/vbconusingslidercontrol.htm, (2 pages) (Copyright 2001).

* cited by examiner

Primary Examiner—Richard Hjerpe
Assistant Examiner—Leonid Shapiro
(74) Attorney, Agent, or Firm—Lerner, David, Littenberg, Krumholz & Mentlik, LLP

(57) ABSTRACT

A method and system for selecting a value from a range of values includes selecting a field having a value, selecting a location of a graphic to choose a value from the range, and then reselecting the field to store the value.

12 Claims, 6 Drawing Sheets

DATA ENTRY USER INTERFACE

CROSS REFERENCE TO RELATED APPLICATION

The present application claims the benefit of U.S. Provisional Patent Application No. 60/191,149 filed Mar. 22, 2000, and U.S. application Ser. No. 09/816,273, filed Mar. 22, 2001, now U.S. Pat. No. 6,867,764 the disclosures of which are hereby incorporated by reference herein.

BACKGROUND OF THE INVENTION

Aspects of the present invention relate to a method and system of data input. Aspects of the invention are particularly useful in use with, but not limited to, microprocessor-based devices operable while being held in a user's hand such as a digital wallet.

Personal digital assistants (hereinafter "PDAs") are small hand-sized computers that are used for storing, manipulating, and retrieving data. Conventionally, PDA's are also provided with an operating system and pre-loaded programs, such as word processing, spreadsheet and other programs. The increasing popularity of PDA's stems from both their relatively low cost and extreme portability compared to, for example, much larger notebook computers. Many users find that for simple computing tasks during trips and other periods of being away from their larger computer devices the bulk and computing power of even a compact notebook computer are simply not needed.

A shortcoming of many PDAs is that it is cumbersome and time consuming to manually input and search through data. Manual data entry requires using a stylus to select and enter data by touching a display screen several times to arrive at a desired location. This process is somewhat time consuming and annoying when all that is desired is to quickly enter some form of information and save it for later retrieval. The problem is exacerbated because a stylus, which is small and can be easily misplaced, is required to navigate through several menus of a PDA to get to the data entry stage.

SUMMARY OF THE INVENTION

In one aspect of the present invention, there is provided a method and system of selecting a value using a touch-sensitive screen. It includes displaying a first value associated with a first field on the screen and displaying a second value associated with a second field on the screen, as well as a graphic on the screen. The graphic has two ends and an indicator positioned between the two ends.

The method and system determine whether the user has selected the first or second value based on whether the user has tapped on first or second value and changes the appearance of the screen to indicate which value has been selected by the user. It also determines whether the user has moved the indicator based on whether the user has slid on the graphic towards or away from one of the ends.

A candidate value is selected from a range of values based on the position of the indicator with respect to an end of the graphic, the range being the first range of values if the first value has been selected and the range being a different second range of values if the second value has been selected. The candidate value is displayed in place of the selected value and the method and system determine whether the candidate value has been tapped by the user. If so, it preferably stores the candidate value as the value of the field associated with the selected value.

DETAILED DESCRIPTION OF THE PREFERRED EMBODIMENTS

Figure 1:
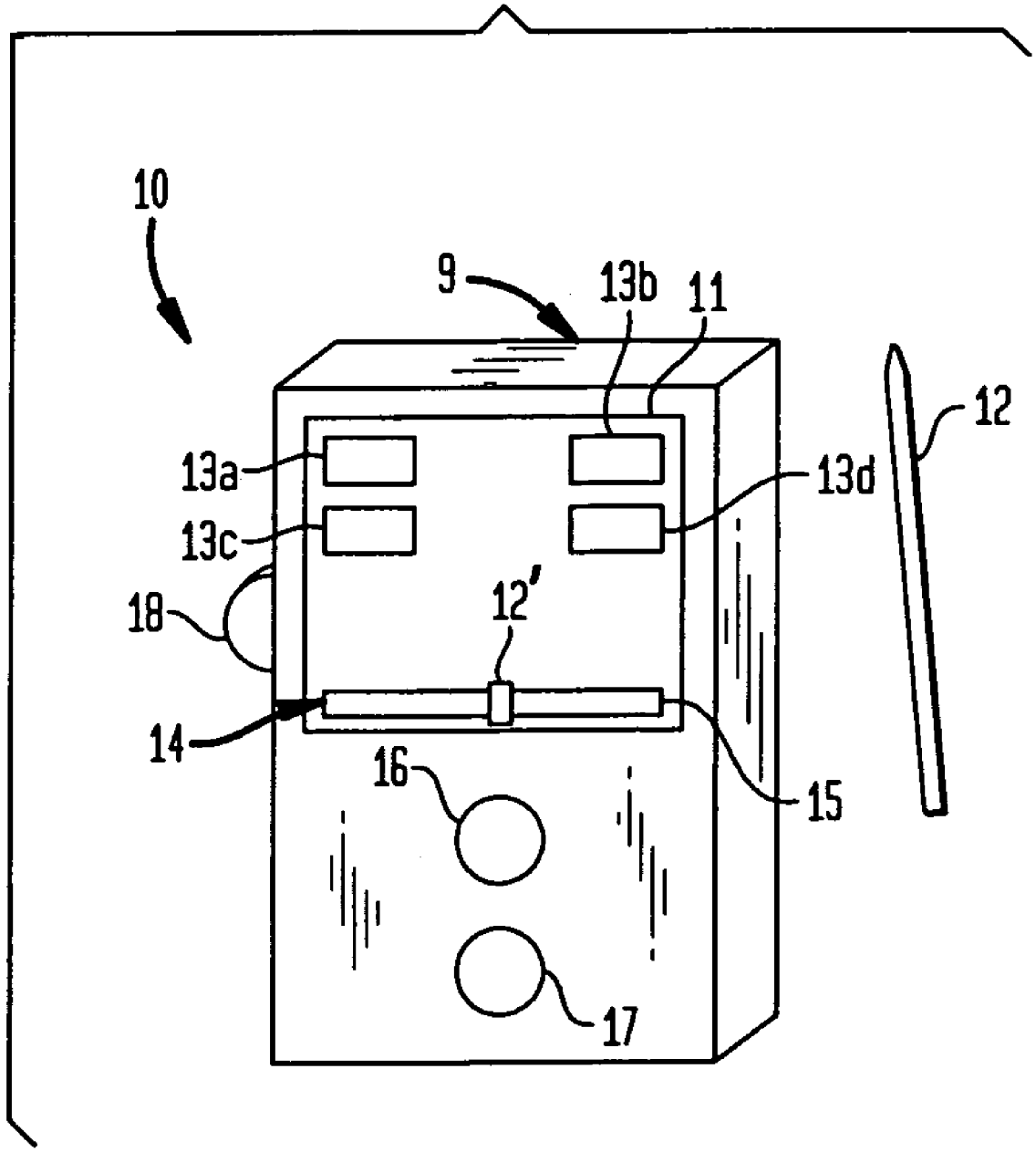
FIG. 1 shows a view of a device in accordance with an embodiment of the present invention.

Referring to FIG. 1, a data input device 10 in accordance with the present invention includes a touch sensitive display screen 11 in a housing 9 for receiving a touch and movement as by a user's finger or a stylus 12. During use, the display screen 11 of the data input device 10 displays at least one area for showing and entering data such as a data entry textbox 13a-d and a slider 14. Slider 14 includes a bar 15 and a pointer 12' disposed along the bar. Data input device 10 may also include buttons 16 and 17 and a mechanical or jog dial 18 for providing commands to the device.

Figure 2:
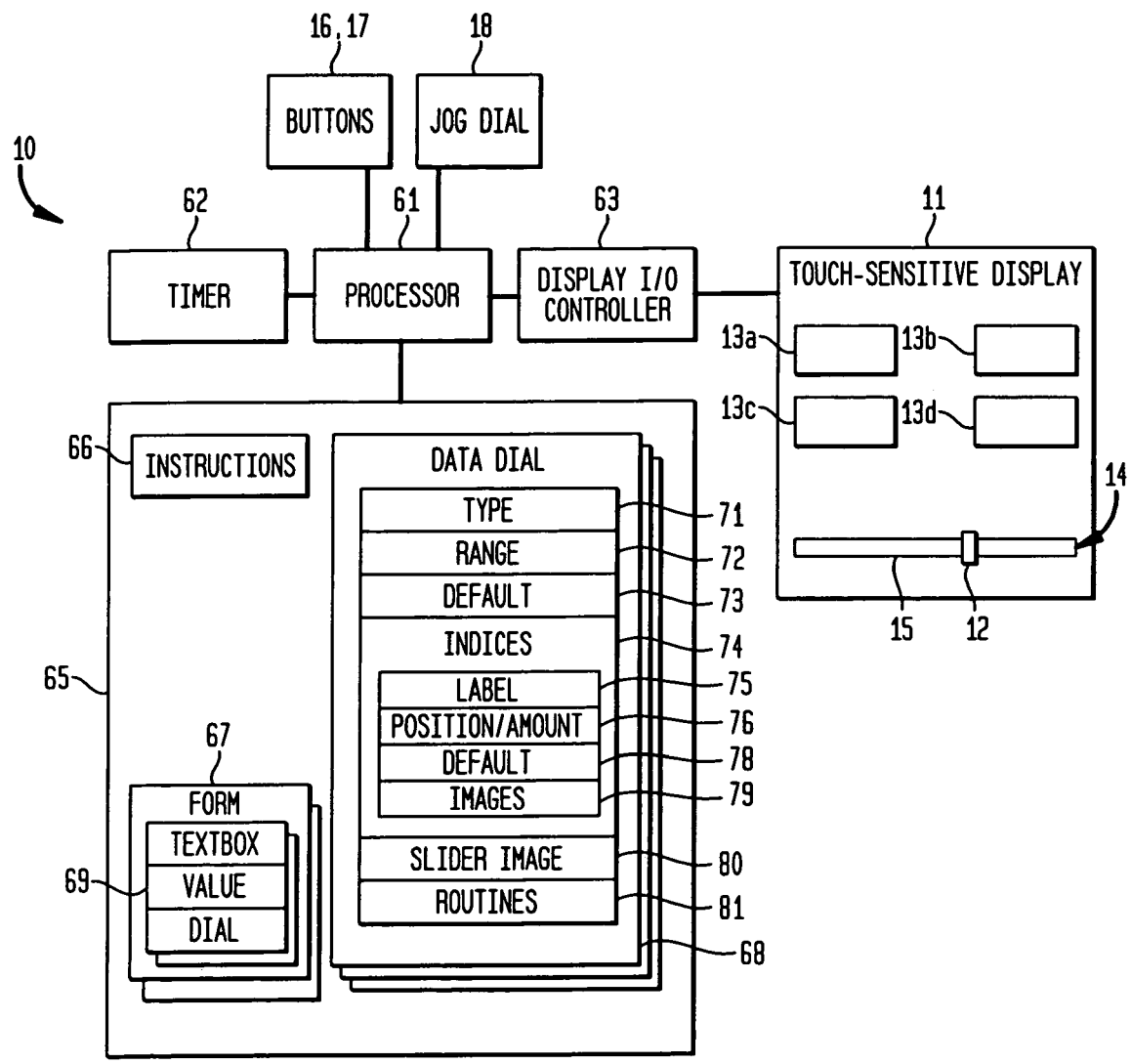
FIG. 2 is a functional system block diagram of a device in accordance with an embodiment of the present invention.

As shown in the functional system diagram of FIG. 2, device 10 further includes a processor 61 in communication with buttons 16, 17 and jog dial 18 as well as a display I/O controller 63, timer 62 and memory 65. Display I/O controller 63, which may be a virtual collection of functions rather than a separate hardware unit, communicates with the touch sensitive display 11. The controller 63 interprets display instructions from processor 61 for display 11, and sends touch location and pressure information (if available) from display 11 to processor 61.

Preferably, device 10 is a personal digital assistant (PDA) or digital wallet having all the internal components (such as those described above) normally found in such devices. In fact, aspects of the present invention are particularly advantageous when used with a digital wallet having no controls, no stylus and a small screen. This is because embodiments of the invention allow entry of data with a single finger while accounting for the imprecise nature of determining where a finger touches a screen. However, device 10 may comprise any device capable of processing instructions in accordance with aspects of the present invention and transmitting data to and from humans or other computers via a display screen. For example, although processor 61 is shown as a single processor, the instructions may actually be distributed to a number of different components or processors for execution.

Processor 61 retrieves, stores and uses data 67, 68 in accordance with instructions 66 stored, along with the data, in memory 65. Instructions 66 collectively define one or more programs the functions, methods and routines of which are explained in more detail below. The term "instructions" and "program" are used interchangeably herein.

Preferably, a portion of the data comprises a collection of data sets referred to herein as "data dials." Data dials 68 include values that are stored in various categories 71-81. As explained in more detail below, data dials are used to set the properties and functions of the slider 14 dependent upon which textbox 13 has been selected by the user. The memory 65 may also include form data 67, where a form contains instructions for displaying information on display 11. Specifically, the form information includes information for displaying a textbox (such as its location) and a value 69 to be displayed in the textbox (the data values are not necessarily stored in the form information but may be stored anywhere in memory). In other words, the textbox is the visual representation of a value within a particular field of a collection of data. Each textbox may be linked to one or more data dials 68.

Figure 3:
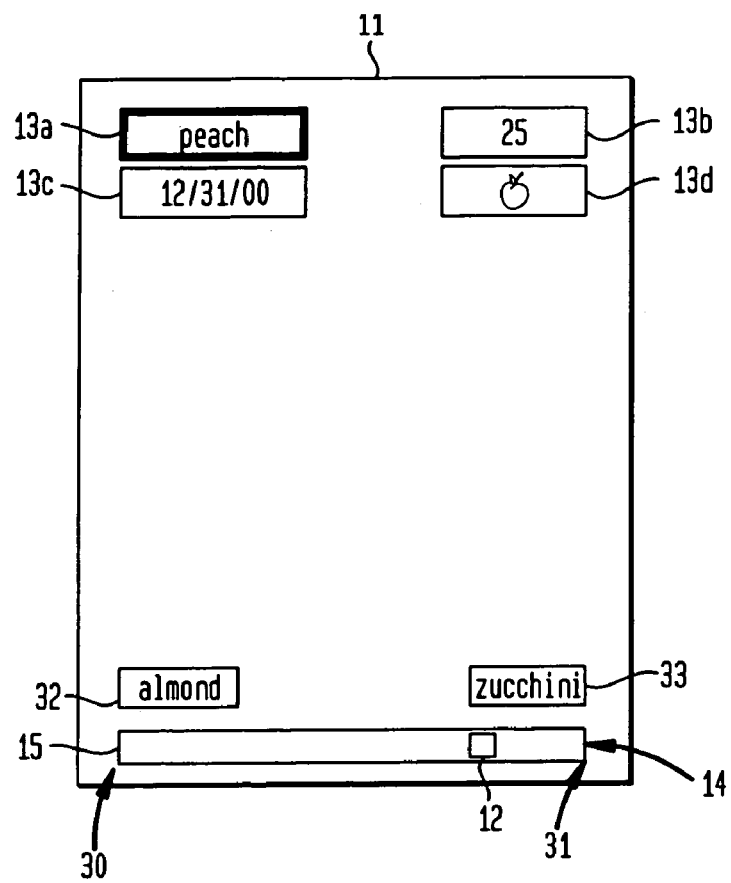
FIG. 3 is a diagram of a screen in accordance with an embodiment of the present invention.

In operation, in accordance with one aspect of the invention, program 66 causes processor 61 to retrieve form information 67 from memory 65. The program uses the form information to display a variety of textboxes 13*a-d*. Textboxes 13*a-d* are populated with their associated values 69. For the purposes of example only and as shown in FIG. 3, textbox 13*a* shall be considered to be associated with a favorite food, textbox 13*b* shall be associated with a person's favorite number, and textbox 13*c* shall be associated with a date that the person needs to remember. Textbox 13*d* is associated with a graphic of the food displayed in textbox 13*a* and, thus, is dependent upon the value shown in textbox 13*a*.

The processor monitors display controller 63 to see if the screen has been touched by pressure from a user's finger or the stylus 12. When the user chooses to manipulate the value of a field, the user will tap the textbox associated with that field. Accordingly, the program uses the location of the contact to determine whether a textbox 13 has been touched, i.e., selected by the user. When the textbox is selected, the textbox changes appearance to indicate which textbox is ready to be edited. As shown in FIG. 3, which assumes that textbox 13*a* has been selected, this indication may include creating a box outline around the field value. Alternatively, some other indication may be used such as flashing the field, changing between highlighted and non-highlighted states, etc.

The program then retrieves the data dial 68 associated with the selected textbox. Data dials 68 define a set of values that can be validly selected by the user. Data dials also contain other information that will help a user quickly retrieve the value they want via slider 14. Preferably, this data is stored in accordance with the requirements of Extensible Markup Language (XML) or some similar syntax. An XML document surrounds data with tags, where the tags provide information about the data contained between the tags.

An XML data dial in accordance with the present invention may include the following categories. Type category 71 describes the type of data, i.e., numeric, alphanumeric, textual dates, images, sounds, etc. Range category 72 specifies a range of valid values. This may be a discrete set of items (such as the names of colors), a description of the range such as the minimum, maximum or type (such as all integers between 0 to 9 or any number to two decimal places between 00.00 and 99.99) or a link to values contained in another database (such as table containing a list of stores frequented by the user). Preferably, a range of discrete items is either presorted (such as in alphabetical or numerical order) or capable of being sorted. Default category 73 defines a default value in case the actual value 69 is not known. Slider image category 80 may include an image to be used for the slider instead of the system's default image. Routine category 81 may include routines that effect how the slider is used to select data.

Indices category 74 includes a number of subcategories. As explained in more detail below, the indices relate to particular values within the range and allow a user to quickly jump to a particular value within the range. Label subcategory 75 contains the words used to describe the index to the user. Position/amount category 76 defines the linear position of the index relative to one end of the slider and a value in the range or the number of values to be traversed when the pointer is at that position. Default category 78 defines whether the particular index is the default index. Image category 79 defines an optional image to be shown to the user (including potentially two images: one when the index is selected and another when the image is not selected).

Accordingly, an XML document for the data dial 68 associated with textbox 13*a*, i.e. the user's favorite food, may appear as follows:

```
<type>
    alphanumeric
</type>
<range>
    almond
    apple
    apricot
    ... {additional values}
    papaya
    peach
    pear
    ... {additional values}
    zucchini
</range>
<default>
    peach
</default>
<indices></indices>
<slider image></slider image >
<routines></routines>
```

As shown above, not all of the categories need to have values: there are no indices, slider images or customized routines associated with this exemplary data dial.

After the data dial is retrieved for the selected textbox, the slider 14 is displayed if it is not already displayed.

The program also chooses the manner in which data is selected by the slider. The particular manner, or mode, in which data within the range is selected by the slider may be chosen based on the type of data and number of values within the range. For ease of explanation, it shall be assumed that when there is a limited number of discrete items within the data dial's range, the following mode is implemented (which shall be hereafter referred to as "absolute" mode).

Regardless of the mode, it is preferable for the slider to provide some indexing marks or other graphical information to indicate to the user what type of data will be entered as the slider is manipulated. The contents of the slider data is tailored to the nature of the field being manipulated. Thus, if the field represents a currency value, then the indices may only show numbers when the slider is ready for manipulation. Similarly, manipulation of the slider will only cause number values to be selected as possible candidates. On the other hand, if the field represents a textual description, then the indices may only show alphanumeric characters when the slider is manipulated.

In absolute mode, the graphics may be two labels 32, 33 positioned created adjacent to (such as above) the two ends 30, 31 of slider 14. One of the labels displays the first item within the range and the other label displays the last item within the range. Thus, using the exemplary data dial, label 32 will display "almond" and label 33 will display "zucchini."

The program also retrieves the currently stored value associated with the selected textbox from memory. If that value is not yet known, the value in default category 73 is assumed. The value may be displayed in the selected textbox.

Once the value is retrieved, the position of pointer 12 with respect to the ends 30, 31 of bar 14 is set so that the distance of the pointer from the two ends is proportional to the number of items in the range above and below the current value. In other words, the pointer is an indicator whose position represents the current value. Using the exemplary data dial, if the user's favorite food is not yet stored in memory 65, then the default value of "peach" is assumed. If "peach" is the 50th of 75 records stored in range category 72, then pointer 12 will be positioned two-thirds ($^{50}/_{75}$) of the distance along bar 14. "Peach" is also displayed in textbox 13a.

Once pointer 12 is in position, the program checks to see whether the area of the screen occupied by slider 14 has been touched and, if so, whether the user "dragged" the pointer or "tapped" the bar 15. For the purposes of clarity, "tapping" the bar means that the user engaged or touched the screen at a location at or substantially adjacent to the area occupied by the bar and then disengaged the screen at substantially the same location. "Sliding" on the bar is similar to "tapping" except that the user moves their finger or the stylus 12 a distance at least somewhat towards an end of the bar before disengaging the screen. A slide may begin and end at the same point. "Dragging" the pointer means that the sliding began at the area, or substantially adjacent to the area, of the screen occupied by the pointer.

As any tapping operation may include some inadvertent movement on the screen, the system preferably uses some logic to determine whether a small slide was actually intended to be a tap. For example, determining whether a touch was a tap or slide may be based on whether the total distance moved was less than some threshold. Alternatively, determining whether a touch was a tap or slide may be based on how long the user maintained contact with the screen. A combination of these and other factors may also be used, such as the current stage of data selection process.

If the user tapped bar 15 at a location different from that of pointer 12, the program selects a potential candidate for the field from range 72 based on the position of the pointer. Preferably, the program selects a value from the range such that the number of values above and below the selected value is proportional to the distance of the pointer from the two ends of the bar. Using the foregoing example, if the bar is 75 pixels long and the bar is tapped 2 pixels to the right of bar end 30, the program will select the candidate value "apple" from range 72 because "apple" is the second of seventy-five items on the list.

If the user drags pointer 12, then the program continuously selects candidate values from range 72 based on the then-current distance of the pointer from the ends 30, 31 of the bar. The selection occurs while the pointer is in motion. The last candidate selected will be based on the final position of the pointer.

Figure 4:
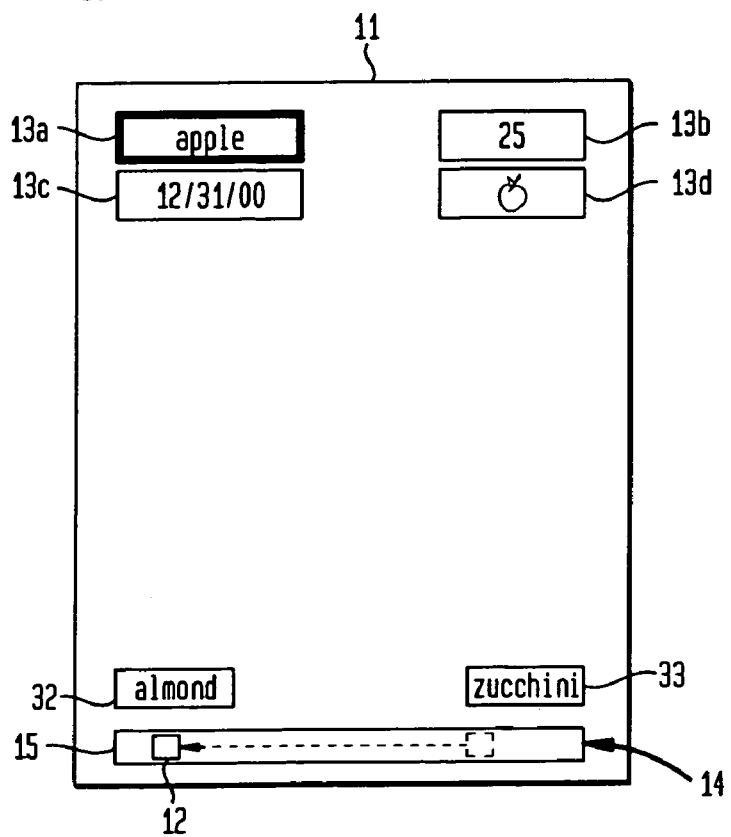
FIG. 4 is a diagram of another screen in accordance with another embodiment of the present invention.

As the candidate values are being selected by the processor in accordance with the program, they are shown in the textbox selected by the user. Using the foregoing example of tapping and, as shown in FIG. 4, the word "apple" would be displayed in textbox 13a. If the pointer was dragged to the same position, then processor 61 would have displayed all of the values between "peach" and "apple" in textbox 13a as the pointer 12 was being dragged before finally stopping on "apple".

The candidate value shown in the selected textbox is not stored as the actual value of the associated field until the user taps the selected textbox after manipulating the slider. Just because the user temporarily stopped dragging the slider does not mean that the user necessarily wants to use the currently displayed value; rather, the candidate value is not committed until the field is tapped. Thus, "apple" is not stored as the value 69 associated with textbox 13a until the user taps textbox 13a. If the user tapped another textbox 13b-13d, before textbox 13a, then the value would not be stored at all; rather the textbox 13a would revert to its original value before the process began.

Accordingly, one advantage of the invention is that it allows a user to quickly select the value of a data field by tapping the area of the screen devoted to showing the value, sliding or tapping a pointer on a slider to cycle through possible choices, and then reselecting the area of the screen devoted to showing the value to confirm and set the choice.

Another advantage of the present invention is its flexibility and ability to easily implement other and even more advantageous options, such as different modes of selecting candidate data.

For example, the invention can seamlessly change the manner in which potential values are selected in response to slider manipulation based on the nature of the underlying data. Specifically, rather than using the position of pointer 12 on bar 14 to select a single candidate value out of the possible range, the pointer position may be used to determine the rate at which candidate values are suggested. For ease of explanation, this latter method of suggesting candidate values shall be called "relative mode."

Figure 5:
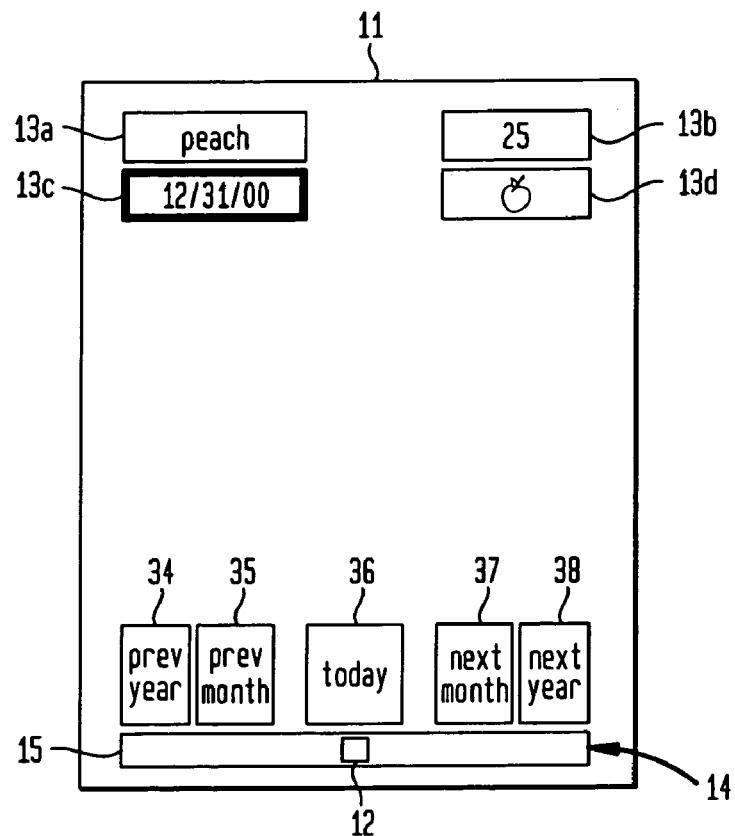
FIG. 5 is a diagram of another screen in accordance with another embodiment of the present invention.

FIG. 5 illustrates an example of the slider in relative mode. If the user selects textbox 13c and the textbox is associated with a field that contains a date value, then the process described above remains the same until the mode is chosen. In other words, the appearance of the selected textbox changes and the data dial associated with the textbox is retrieved. However, for the purpose of illustration, it shall be assumed that the data dial 68 associated with textbox 13c is as follows:

```
<type>
    date
</type>
<range></range>
<default>
    system date
</default>
<indices>
    <index1>
        <label>
            prev year
        </label>
        <position>
            0.0, -365 days
```

-continued

```
        </position>
        <image></image>
    </index1>
    <index2>
        <label>
            prev month
        </label>
        <position>
            0.2, -30 days
        </position>
        <image></image>
    </index2>
    <index3>
        <label>
            today
        </label>
        <position>
            0.5, 0 days
        </position>
        <default = true>
        <image></image>
    </index3>
    <index4>
        <label>
            next month
        </label>
        <position>
            0.8, +30 days
        </position>
        <image></image>
    </index4>
    <index5>
        <label>
            next year
        </label>
        <position>
            1.0, +365 days
        </position>
        <image></image>
    </index5>
</indices>
<slider image></slider image >
<routines></routines>
```

In the foregoing example, it will be noticed that the range has no minimum or maximum value and there is no list of discrete dates to choose from. Rather, the valid range of the field is any date. It will also be noticed that particular indices have been chosen to help the user's selection of candidate data.

In an instance such as the foregoing, the program may choose to use relative mode. This decision may be made based on a variety of factors including the fact that because there is no minimum and maximum value, there is no minimum and maximum value to associate with the ends of bar 15. Moreover, even if there had been a minimum and maximum value for the range, if there had been a very large number of candidate values within the range, then small changes in pointer position would result in large and unmanageable jumps in value. This would make it very hard to select the correct value, especially given the inaccuracy of determining screen position based on a finger touch. (A finger touch often covers an area of the screen greater or somewhat offset from the area the user was aiming for.) Rather than the program choosing the mode, the mode may also be predefined by the data dial or chosen at run-time by the user. Regardless of how the mode is selected, it shall be assumed that selection of textbox 13*c* places the slider in relative mode.

In relative mode, the index information 74 is retrieved from data dial information 68. The labels are positioned in accordance with position information 76 and labeled with the words in label information 75. Using the exemplary XML document, labels 34-38 bearing the words "prev year", "prev month", "today", "next month" and "next year" are displayed at positions equal to 0% of the width of the bar 15 (i.e., at the left-most point), 20% of the bar width, 50% of the bar width (i.e., in the middle), 80% of the bar width, and 100% of the bar width (i.e., at the right-most point), respectively.

The current value 69 of the selected field is also displayed or, if the value is not yet known, the default value 73 from the data dial 68 is used. In this example, it shall be assumed that the value of textbox 13*c* has not been set yet. Accordingly, the data dial's default of using the system's current date (which shall be assumed to be Dec. 31, 2000) is displayed.

Once the slider is displayed, pointer 12 is placed at a starting position. Because the exemplary data dial indicates that the "today" index is the default index, the pointer 12 will be placed at the same position as that index, i.e. halfway along slider 14.

The program next monitors where the user tapped on screen 11 and selects a candidate value based on what was tapped or slid.

If the user taps on an index label, the program checks the cycle amount 76 associated with that index and selects a candidate value by incrementing or decrementing the current candidate by that amount. For example, if the user tapped the "next month" index label 37, the current candidate date of Dec. 31, 2000 displayed in textbox 13*c* will be incremented by "+30" days. The candidate date of Jan. 30, 2001 would accordingly appear in textbox 13*c*. Repeated tapping on the same index would increment the candidate date by the same amount yet again. Subsequently tapping on another index label would select another potential value by incrementing or decrementing the current candidate value by the cycle amount associated with that index.

Figure 6:
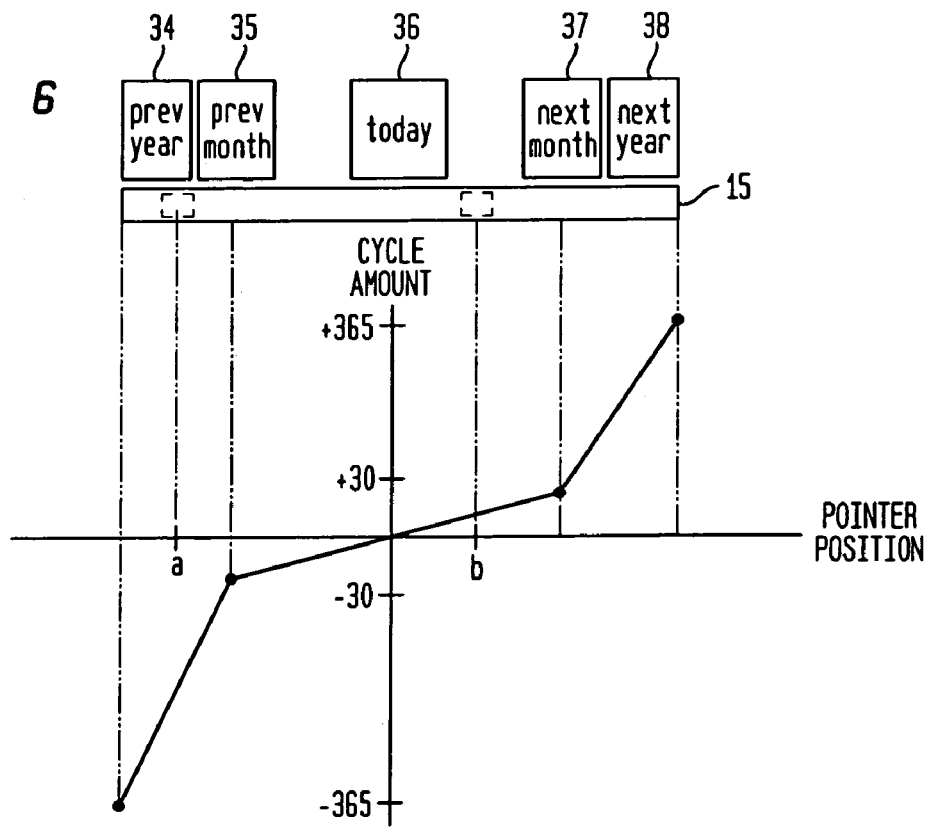
FIG. 6 is a graph of index cycle amounts versus pointer positions in accordance with an embodiment of the present invention.

If the user taps on the bar, then the program will determine the increment or decrement amount based on the position of the pointer relative to the positions of the index values. FIG. 6 graphs how the cycle amount can be extracted from the pointer position and indices in accordance with one embodiment. If the user taps between two indices, the program extracts the cycle amount based on the linear relationship between the cycle amounts of the two indices. Thus, tapping the bar at position "a" halfway between indices 34, 35 would cause the program to compute a cycle amount (−200 days) which is halfway between the cycle amount of index 34 (−365 days) and index 35 (−30 days). The program would thus select a candidate value that is 200 days prior to the currently displayed candidate date. Similarly, tapping at position "b" midway between indices 36 and 37 would cause the program to select a candidate value that is 15 days after the currently displayed candidate date.

If pointer 12 is dragged along the bar, then the process may be the same as that described above with respect to tapping except that the candidate value is continuously incremented or decremented based on the current position of the pointer until the user stops moving the pointer. Preferably, program 66 will utilize timer 62 so that candidate values are selected at a pace useful to the user, i.e., once or twice a second. Otherwise, the processor may increment and decrement candidate values too fast for the user to select.

The candidate value selected by the program is displayed in the selected textbox 13*c*. The pointer 12 is positioned at the point of the tap or end point of the drag so that the user can see the amount of the decrement or increment.

As with the absolute mode, the displayed candidate value is not set as the value of the field or stored as value 69 until the user taps the selected textbox 13*c*.

Relative mode may be used for nearly any type and range of data. For instance, relative mode could also have been used to cycle through a range of discrete values. In such an instance, the cycle amount will reflect how many items should be skipped up or down when choosing a candidate value. Using the food data dial as an example, if the current candidate value is "papaya" and the cycle amount is +2, then the next selected candidate value would be "pear". Moreover, simply by changing the cycle amounts associated with the indices, the data for one field can be cycled at a far faster or slower rate than data in another field. It should be understood that terms such as "up", "down", "forward", "backward", "left", "right", "one direction", "other direction" may also be used in place of "increment" and "decrement."

Accordingly, the data dials and tap-slide-tap aspects of the invention, which are advantageous in and of themselves, create a host of additional advantages when joined together. By using tap-slide-tap, the user is provided with a consistent interface that allows the user to select and cycle through data by tapping and dragging on the slider. Regardless of the nature of the data, the general operation of the select-change-confirm is the same. Yet, by using data dials, the particular and unique needs of the underlying data can be addressed without discarding the tap-slide-tap aspect or even changing the size or position of the slider.

The underlying device input architecture can be tailored to special data domains when necessary (dates, times, currency, etc.) without being hard-coded to a fixed set of data. This allows the platform (such as a digital wallet with having relatively limited screen space and few hardware controls) to have a great deal of flexibility, enabling it to grow in capabilities as the user needs/wants to access more and more services. An additional advantage is that the slider can always remain at the same place and same size regardless of what sort of data is being entered. This consistency is appreciated by most users.

Moreover, each data dial 68 can customize the behavior of the slider by adding routines 81 to the data dial information. In one embodiment, a routine 81 may contain instructions stating that tapping on an index 34-38 causes potential data to be chosen using the relative mode whereas tapping on the bar 15 causes data to chosen using absolute mode. For example, the exemplary data dial associated with textbox 13*a* may define labels 32 and 33 as indices having cycle amounts of −1 and 1, respectively. Thus, tapping on labels 32 and 33 would cause the candidate value to be incremented or decremented by one, such as from "almond" to "apple". However, if the user tapped or dragged on bar 15, the candidate value would be chosen so that the position of the candidate value within range 72 is proportional to the distance of pointer 12 from ends 30, 31 of bar 15.

In one embodiment, the cycling of candidate values does not end when a minimum or maximum value within the range is reached. Rather, the program will jump from the minimum to the maximum value or vice versa, allowing the user to cycle through all of the values yet again in the same direction they were traversing it before. This, in part, is why the term "data dial" is used. A range of discrete data can be considered to be not just a line, but rather a dial like minutes around a clock or numbers around a combination lock.

In another embodiment, changing the value in one field may also change values in other fields. As shown in FIG. 2, the value of textbox 13*d* is a picture of the word in textbox 13*a*. Accordingly, when the textbox 13*a* is changed, textbox 13*d* will be changed as well. The dependencies between two fields and textboxes may be defined in the data dial.

Advantageously, index markers are not limited to relative mode. Rather than simply showing two labels 32, 33 relating to maximum and minimum values in the range, index labels may also be shown. In this instance, the amount of the indices do not correspond with how much to increment or decrement the currently-selected candidate value. Rather, the amount of the index will be a pointer to a particular spot within the range. Accordingly, an index may be provided for the "papaya" value, whereby a label bearing the word papaya is shown at a position somewhat midway along bar 15 and tapping on the label would cause the program to select "papaya" as the current candidate value.

In yet another embodiment, the program monitors the values previously chosen by a user and uses that history to predict what the user will choose the next time. For example, if two different textboxes and fields are both linked to the same data dial, then changing the default value 73 to the most recently-used value from range 72 will cause the default value to be perpetuated to the other linked textbox.

It is also quite advantageous to synergistically link indices with predictive lookups, particularly in absolute mode. An index can be dynamically changed to the last entered value. Therefore, to jump to that value in absolute mode, the user need do no more than tap on a label that is positioned exactly above the spot on that bar which corresponds with that value.

The flexibility of the device is also evidenced by its ability to be used with wide ranges of data. For example, the type 71 of a data dial 68 may be sound clips and range 72 may define a set of links to sound files stored elsewhere in memory 65. As the user is cycling through values, the name of the candidate sound file will be shown in the appropriate textbox. When the user stops cycling, the sound clip would be played, giving the user a chance to hear it. The user can then accept the candidate or choose another one.

Another routine 81 may allow the user to cycle through data by sliding on bar 15 but not necessarily dragging the pointer 12. For example, if the slider 14 is in absolute mode and the user slides along the bar from end 31 to end 30 when the pointer is somewhere in the middle, the slider may temporarily select data via relative mode, where the cycle amount is proportional to the length traveled. The direction of the cycle is determined by the direction of the slide. Potential values may be continuously selected and displayed until the user taps the slider or a textbox.

Figure 7:
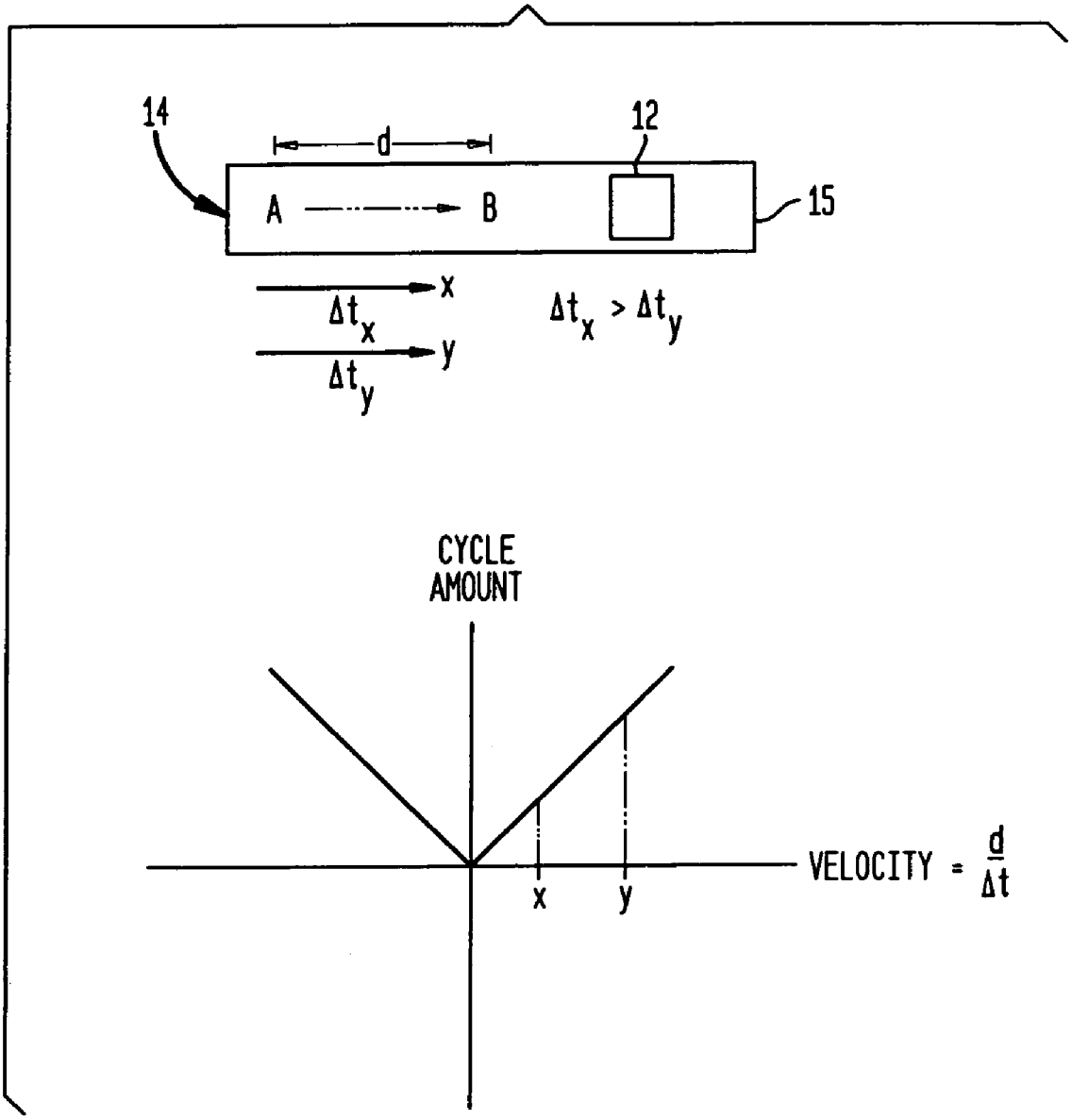
FIG. 7 is a graph of cycle amounts versus velocities in accordance with an embodiment of the present invention.

Rather than basing the cycle amount of such a slide on the distance traveled, the cycle amount may also be a function of acceleration or velocity. A quick motion may cause the program to choose a cycle amount greater than the cycle amount chosen for a slower motion. As shown in FIG. 7, it shall be assumed that the user touches the bar at point A and slides a distance d along bar 15 to point B. While the distance may be the same, different speeds will produce different results in the selection of data. If it takes $\Delta t_x$ seconds to move distance d and $\Delta t_y$ seconds to move the same distance d, and $\Delta t_x$ is greater than $\Delta t_y$, then the velocity x of the first slide will be slower than velocity y. As shown in the graph, the program may interpret this slower velocity as meaning the user prefers to cycle through the data at a slower rate. Alternatively, the graph of FIG. 7 could have represented cycle amounts versus acceleration. This input strategy allows the user to move quickly to the general area of desired data, and then use a more precise motion to find and select the candidate value.

Figure 8:
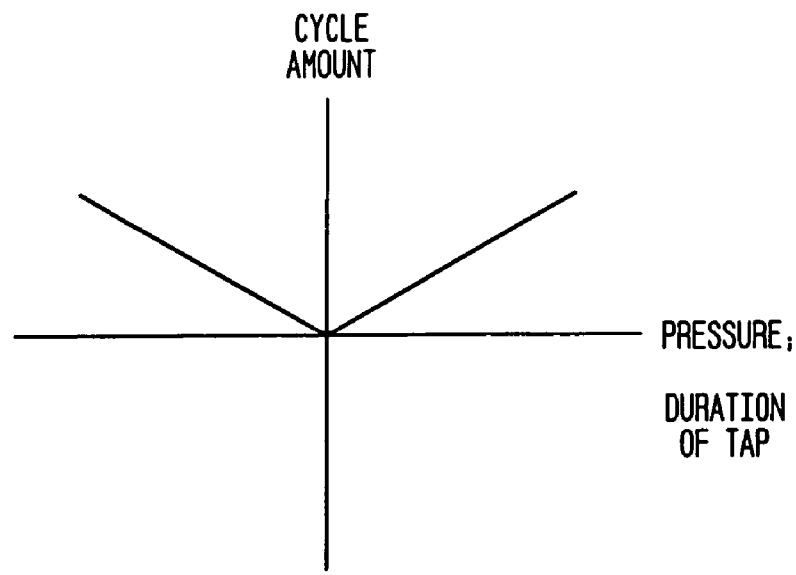
FIG. 8 is a graph of cycle amounts versus pressure in accordance with an embodiment of the present invention.

Yet further, as shown in FIG. 8, the cycle amount may be function of pressure applied on the screen if the controller 63 is capable of detecting the amount of pressure applied. It is particularly advantageous to test for pressure at the ends of the bar, where the harder the user presses on one end, the faster the program cycles through the candidate values. If pressure information is not available, then the program may choose to analogize the duration of a tap to pressure.

In addition, the cycle amount is not necessarily limited to determining how many candidate values are skipped when scrolling through data. Rather, the cycle amount may solely or also represent the frequency with which candidate items are displayed in the textbox. The greater the frequency, the more quickly values are displayed. For example, the processor may cycle though each item in the range sequentially, and not skip any. If the cycle amount is three, then three candidate values would be shown in sequence every second. On the other hand, if the cycle amount is twenty, then twenty candidate values would be shown in sequence every second.

Figure 9:
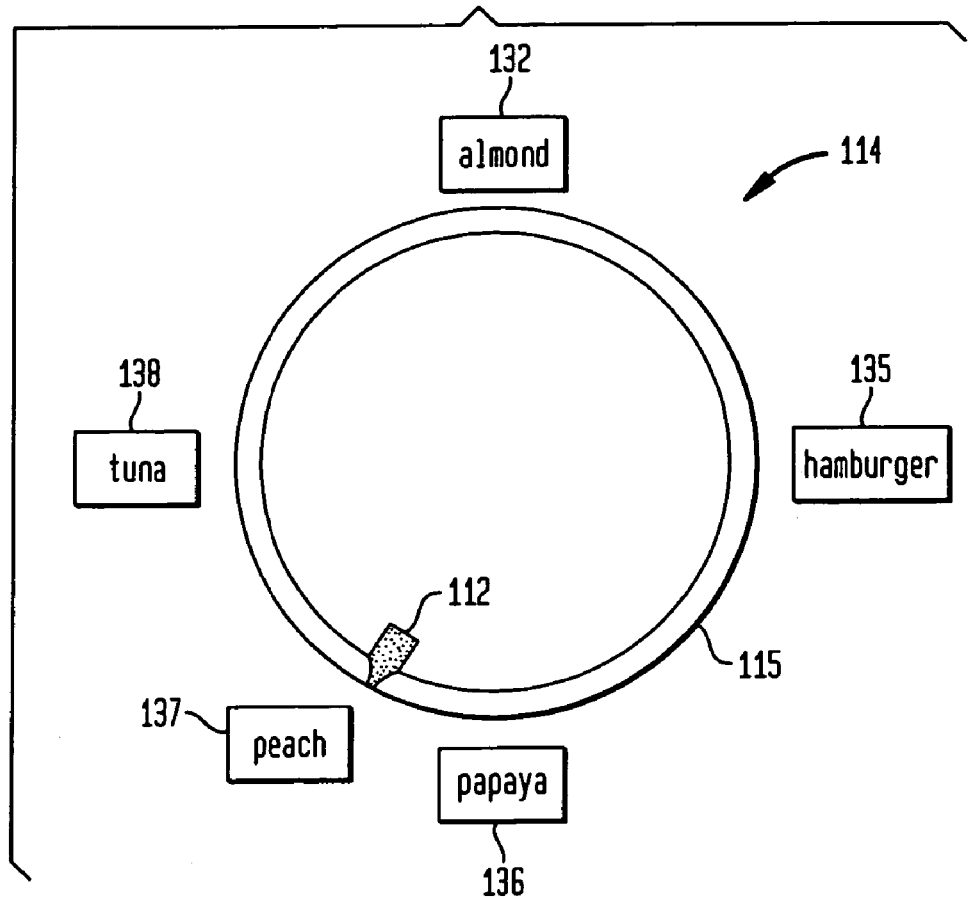
FIG. 9 is a graph of a slider image in accordance with an embodiment of the present invention.

Although slider 14 has been consistently shown as a bar 15 and pointer 12, it could also be any other graphic defining a set of locations associated with a range, particularly a range between a minimum and a maximum. FIG. 9 illustrates an alternative slider configuration 114 that may be defined by slider image category 80 of a data dial 68. Like bar 14, it has a pointer 112, an area 115 upon which the pointer may be dragged or located, and indices 132, 135-138 including a predictive lookup index 137. The tab two "ends" may be at substantially the same spot, i.e., adjacent index 134. The slider may even omit the pointer 112 because, as explained above, the user may cycle through values without even touching the pointer, such as by sliding and tapping on the bar. However, the use of a pointer is preferred in light of the unique advantages and flexibility that it provides when used in connection with aspects of the invention.

The user may also cycle through data using an input device other than a touch-screen. For example, a textbox may be selected by using buttons 16, 17. Mechanical dial 18 could be used to cycle through the data; by using a finger to turn the mechanical dial 18, processor 61 will cycle through the data at a rate proportional to the movement of the mechanical dial. Other combinations of input means may also be used, such as using buttons 16 and 17 to scroll through the data. The pointer may also be dragged by using a mouse to position a cursor over the pointer, clicking a button down, moving the mouse, causing the pointer to follow the correspondingly moving cursor, and then releasing the button when the pointer is at the desired location. Indeed, the slider may be implemented as hardware, comprising a mechanical pointer disposed in a physical slot. However, a primary advantage of aspects of the invention are their ability to allow the user to precisely select data via touch even though touching a screen with a finger typically tends to be much less precise than other input devices.

The data structures described herein, such as data dial 68, are exemplary only. Other data structures, such as different fields and tables or completely different methods of storing information such as database tables or the like, may also be used instead.

Unless stated to the contrary, any use of the words such as "including," "containing," "comprising" and the like, means "including without limitation" and shall not be construed to limit any general statement that it follows to the specific or similar items or matters immediately following it. Any use of the world "plurality" means at least two of the referenced thing.

Although aspects of the present invention has been described with reference to particular preferred embodiments, it is to be understood that the embodiments are merely illustrative of the principles and application of aspects of the present invention. It is therefore to be understood that numerous modifications may be made to the preferred embodiments and that other arrangements may be devised without departing from the spirit and scope of the present invention as defined by the claims.

The invention claimed is:

1. A method of selecting a value using a touch-sensitive screen comprising:
    displaying a first value in a textbox on the screen;
    displaying a graphic on the screen, the graphic having two ends and an indicator having a first position between the two ends;
    determining whether the user has selected the textbox;
    changing the appearance of the screen to indicate the textbox has been selected by the user;
    determining whether the user has moved the indicator from the first position to a second position towards or away from one of the ends;
    selecting a candidate value from a range of values based on the second position of the indicator and as a function selected from a group consisting of the velocity at which the user moves the indicator from the first to the second position, the acceleration at which the user moves the indicator from the first to the second position, the pressure applied on the screen at the indicator or at either end, and the duration the user has tapped on the indicator or on either end;
    displaying the candidate value in the textbox; and
    storing the candidate value as the value associated with the textbox if the textbox is tapped after the step of selecting a candidate value.

2. A method of selecting a value comprising:
    displaying a first and second textbox on a screen;
    determining whether a user has selected the first or second textbox based on whether the user has tapped on the first or second textbox, respectively;
    selecting a first or second set of data depending on whether the first or second textbox was selected, respectively, and wherein each set of data includes a different range of values;
    displaying a graphic on the screen, the graphic having two ends, and an indicator positioned between the two ends, wherein a length between the two ends represents a range of values of the selected data set;
    determining whether the user has moved the indicator based on whether the user has slid on the graphic towards or away from one of the ends;
    selecting a candidate value from the selected data set based on the position of the indicator and as a function selected from a group consisting of the velocity at which the user moves the indicator, the acceleration at which the user moves the indicator, the pressure applied on the screen at the indicator or at either end, and the duration the user has tapped on the indicator or on either end; and
    displaying the candidate value in the selected textbox.

3. The method of claim 2, wherein the selected data set is an extensible markup language file.

4. The method of claim 2, wherein the step of displaying the candidate value in the selected textbox replaces a previously displayed value in the selected textbox.

5. The method of claim 2, wherein the determining steps are performed by a processor that sets the value for the selected one of the textboxes and replaces a previously displayed value in the selected one of the textboxes.

6. A method of selecting a value with a device, the device providing a first and second textbox and a slider control having a movable indicator, said method comprising:
   associating the slider control with a first set of data if the first textbox has been selected;
   associating the slider control with a second set of data if the second textbox has been selected, wherein the first data set contains a different collection of values than the second data set;
   selecting a value in response to movement of the indicator and as a function selected from a group consisting of the velocity at which the user moves the indicator, the acceleration at which the user moves the indicator, the pressure applied on the screen at the indicator, and the duration the user has tapped on the indicator, such that moving the indicator will select a value from the first data set if the first textbox is selected, and moving the indicator will select a value from the second data set if the second textbox is selected;
   displaying the value selected; and
   storing the displayed value.

7. The method of claim 6, wherein the textboxes are displayed on a touch-sensitive screen and a textbox is selected by tapping the area of the screen occupied by the textbox.

8. The method of claim 7, wherein the step of storing the displayed value comprises storing the displayed value if the selected textbox is tapped after the indicator is moved.

9. A method of selecting a value with a touch-sensitive screen, wherein one area of the screen is occupied by a first textbox, another area of the screen is occupied by a second textbox, and yet another area of the screen is occupied by a slider having a movable indicator, said method comprising:
   associating the slider area of the screen with a first set of data if the area of the screen occupied by the first textbox has been tapped;
   associating the slider area of the screen with a second set of data if the area of the screen occupied by the second textbox has been tapped, wherein the first set of data contains a different range of values than the second set of data;
   selecting a value in response to movement of the indicator and as a function selected from a group consisting of the velocity at which the user moves the indicator, the acceleration at which the user moves the indicator, the pressure applied on the screen at the indicator, and the duration the user has tapped on the indicator, such that moving the indicator will select a value from the first set of data if the first textbox has been tapped, and moving the indicator will select a value from the second set of data if the second textbox has been tapped;
   displaying the selected value, wherein the selected value is displayed in the area of the screen associated with the tapped textbox; and
   storing the displayed value.

10. An apparatus comprising:
    a touch screen for displaying one of a number of fields and a slider having a position indicator;
    a storage device for storing a number of data sets, each data set being associated with a corresponding one of the number of fields, each data set including range values for the slider; and
    a processor, responsive to a selection of one of the number of fields by a user, for retrieving the associated one of the number of data sets and for setting a range of the slider to the range values of the associated data set;
    wherein the processor sets a value for the selected one of the number of fields as a function selected from a group consisting of the velocity at which the user moves the indicator, the acceleration at which the user moves the indicator, the pressure applied on the screen at the indicator, and the duration the user has tapped on the indicator.

11. The apparatus of claim 10, wherein the data sets are extensible markup language documents.

12. The apparatus of claim 10, wherein the fields are text fields.

* * * * *